Patented Feb. 7, 1950

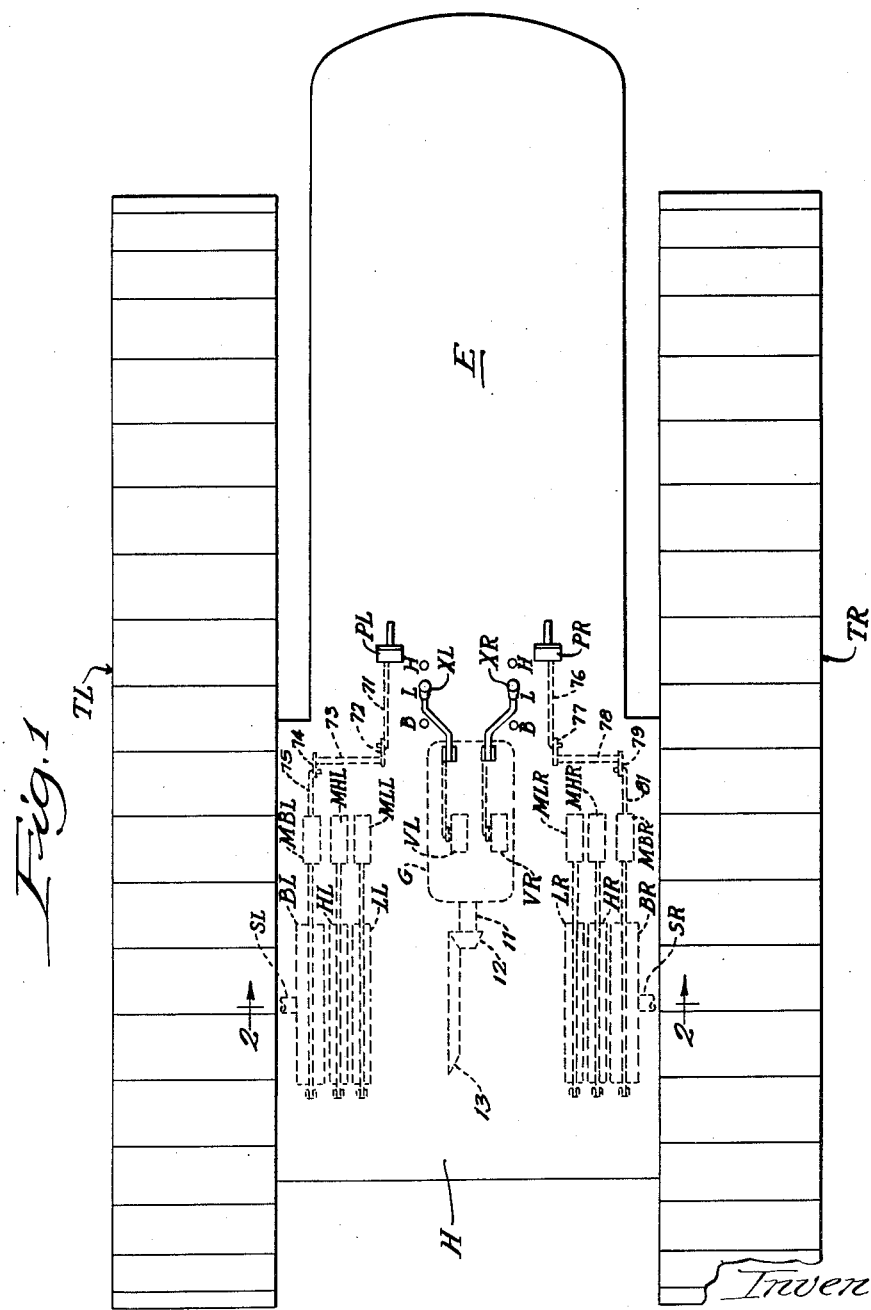

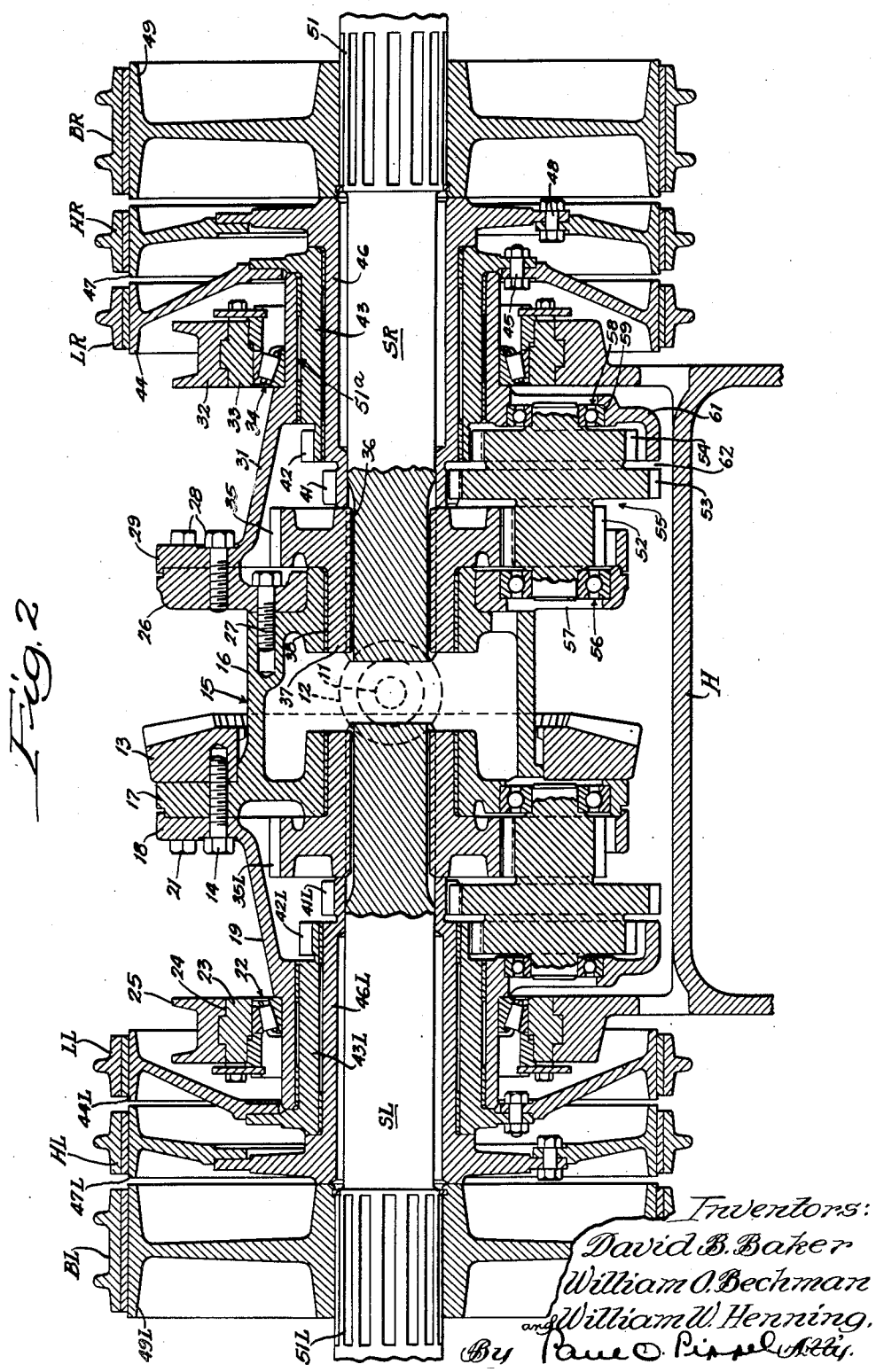

2,496,429

UNITED STATES PATENT OFFICE 2,496,429

VEHICLE CHANGE-SPEED AND STEERING GEAR

David B. Baker, Riverside, William O. Bechman, Chicago, and William W. Henning, River Grove, Ill., assignors to International Harvester Company, a corporation of New Jersey Application December 4, 1944, Serial No. 566,438

2 Claims. (Cl. 74—720.5)

1

This invention concerns gearing for transmitting driving force to the endless propelling tracks of crawler-type tractors and has to do more in particular with an improved unit of such gearing which is capable of selectively transmitting different speeds in the same direction to the tracks or selectively braking the tracks.

The general object of the invention is the provision of a steering transmission operable to add to the maneuverability of crawler tractors and itself susceptible of ease in manipulation in obtaining the desired maneuvers. This is accomplished by employing a plurality of definite speed transmitting power trains as well as a brake for each track and means whereby any train or the brake for either track can be established or applied concurrently with establishment or application of any train or brake for the other track.

A further object is the provision of a planetary type of change-speed gearing in the unit, wherein the planet gear carrier includes axially extending portions embracing the gears and provided with bearings which are axially spaced a great distance to lend stability to the carrier and gearing.

The full significance of these objects as well as other desirable objects, advantages and capabilities of the invention will be better understood from the ensuing description and the annexed drawings, wherein:

Figure 1 is a plan view of a crawler tractor with which change speed steering gear units embodying the present invention are utilized, there being controls for the transmission shown in the figure; and Figure 2 is a vertical sectional view taken axially through a gearing unit embodying the present invention, the view being taken upon the vertical plane indicated by the lines 2—2 in Figure 1.

The tractor 10 of Figure 1 has an engine E mounted upon the forward portion of its frame and a frame housing H comprising the rear portion of the tractor body for containing the change speed transmission unit shown in Figure 2. At opposite sides of the tractor are propelling means in the form of endless treads or tracks TL and TR which are respectively at the left-hand and right-hand sides of the tractor. The left-hand track TL is driven by spur gears and a chain sprocket (not shown) which receive driving force from a propelling-means-driving shaft SL. A similar driving connection

2 exists between a propelling-means-driving shaft SR and the right-hand track TR. This driving connection between the shafts SL and SR and the endless tracks may be of the character illustrated in a copending application of David B. Baker et al., Serial No. 542,146, filed June 26, 1944, for Frame and draw-bar structure for crawler tractor, now issued into Patent No. 2,391,002.

Referring now to Figure 2, the transmission unit there shown, constituting an embodiment of this invention, is a symmetrical arrangement wherein there are two identical change speed portions. One of these change speed portions is arranged about the shaft SL, while the other of such portions is arranged about the shaft SR. Driving force for the unit is received from a shaft 11 carrying a pinion 12 in a manner constrained for rotation therewith. This pinion 12 meshes with a ring gear 13, which is fastened by capscrews 14 spaced circumferentially thereabout to a fabricated drum-like planetary gear carrier structure 15. A center part 16 of the carrier has a radial flange 17 against which the ring gear 13 is drawn by the capscrews 14 and which flange 17 serves also as a mounting for a flange 18 upon a frusto-conical extension 19. Circumferentially spaced capscrews 21 provide an anchorage between the flanges 17 and 18.

The outer periphery of the carrier extension 19 is mounted within the inner race of a tapered roller bearing unit 22 and the outer race of this bearing unit is mounted within a carrier 23 therefor, which in turn is mounted within an opening 24 within a boss 25 of the frame housing H.

Upon the right end of the carrier central portion 16, there is secured an annular member 26 corresponding to the flange 17 upon the left end of the center portion. The member 26 is attached to the carrier central portion 16 by capscrews 27 and additional capscrews 28 spaced circumferentially about the structure and in radial staggered relation secure a flange 29 of a frusto-conical extension 31 of the carrier to the annular member 26. The outer end of this frusto-conical member 31 is mounted in a housing bearing boss 32 by means of a bearing carrier 33 and a tapered roller bearing unit 34.

Referring now to the right-hand portion of Figure 2, the inner end of the track driving shaft SR has a sun gear 35 splined thereto at 36. An axially extending hub portion 37 of the sun gear is journaled within a bearing 38 within the carrier 15 for maintaining a coaxial relation of said sun gear, the shaft and the carrier. Additional sun gears 41 and 42 coaxial with the gear 35 are spaced axially outwardly therefrom. The larger diameter gear of these two additional gears is formed integrally with a sleeve shaft 43 which is journaled within the outer end of the carrier structure 15 and which carries a brake drum 44 having its hub secured thereto by circumferentially spaced bolts 45. The smaller sun gear 41 is formed integrally with a sleeve shaft 46 journaled within the sleeve shaft 43 and having the hub of the brake drum 47 secured thereto by circumferentially spaced bolts 48. A third brake drum 49 has its hub splined to the track driving shaft SR at the splined section 51. Gear 41 is smaller in diameter than the inside diameter of the sleeve 43 so such gear can be withdrawn through such sleeve together with the sleeve 46 for repair or replacement, or to facilitate removal of the brake drum following removal of the shaft SR and the drum 49. Likewise the sleeve 43 and the gear 42 may be axially withdrawn from the internal bearing 51a of the carrier in which sleeve 43 is journaled since the gear 42 is smaller in diameter than said bearing.

The three sun gears 35, 41, and 42 mesh respectively with the three gears 52, 53, and 54 of each of three gear clusters 55 (one being shown) journaled within and spaced circumferentially about the carrier structure 15. The inner end of each gear cluster is journaled within a ball bearing unit 56 carried within a hole 57 in the annular member 26 of the carrier structure, whereas the outer end of each of these three gear clusters is journaled within a ball bearing unit 58 reposing within an opening 59 formed within a radial boss portion 61 of the frusto-conical extension 31. An opening 62 within each boss portion of the frusto-conical part 31 permits the gear 53 of the associated gear cluster to project outwardly of the carrier.

During rotation of the carrier structure 15, by means of driving force received by the pinion 12 and the bevel pinion 13, should a brake band LR be applied to the brake drum 44 to prevent rotation of this brake drum and consequently prevent rotation of the gear 42, the planet gear clusters 55 will function to impart rotation to the sun gear 35 and to the track driving shaft SR at a definite speed ratio with respect to the speed rotation of the carrier and in the same direction that this carrier is rotated. Assuming the gear 42 is stationary while the gear clusters 55 are revolved pursuant to rotation of the carrier, the gears 54 meshing with the stationary gear 42 will be caused to roll about said gear 42 while causing the gear clusters to rotate about their individual axes. This rotation of the gear clusters about their individual axes will be in the direction tending to part rotation to the sun gear 35 in the direction opposite to that in which said clusters are being planeted or revolved. Since, however, the gears 52 are smaller in diameter than the gears 54, the peripheral speed of the gears 52 will be less than their planeting or revolving speed, wherefore, a net speed of the gears 52, circumferentially of the sun gear 35 at the points of contact between the teeth of the gears 52 and 35, will be in the direction the carrier structure is rotated but at a reduced speed. Thus, the gear 35 and the shaft SR, when the brake band LR is applied, will be caused to rotate in the same direction as the planet gear carrier but at a reduced speed with respect thereto.

A somewhat higher speed of the shaft SR can be obtained in the same direction as the carrier, but also at a reduced speed with respect to carrier rotating speed by applying a brake drum HR to the brake drum 47. In this manner, the brake drum 47 is held against rotation while the brake drums 44 and 49 are free to rotate. When the brake drum 47 is held against rotation, the smaller diameter gear 41 is also held against rotation. Since the gear 41 has a smaller tooth pitch-line diameter with respect to the gear 53 than has the gear 42 with respect to the gear 54, the non-rotating gear 41 will cause the revolving gear clusters to rotate at a slower speed about their individual axes with the net result that the cluster gears 52 will carry the sun gear 35 at a higher speed in the direction of the carrier rotation.

Under certain operating conditions which will become hereinafter apparent, it is desirable to hold the shaft SR against rotation while neither of the brake bands LR or HR is applied for causing the transmission of driving force to said shaft SR. Such holding of the shaft SR against rotation is accomplished by applying a brake band BR to the drum 49.

Inasmuch as the gearing, brake drums and brake bands, assembled about the left-hand shaft SL, contain parts respectively corresponding to and operating identically with the gearing, brake drums and brake bands, just described in association with shaft SR, these corresponding parts have been identified by the same reference characters excepting for the addition of the letter "L," or the substitution of the letter "L" for the letter "R".

A hydraulically operated brake actuating mechanism may be employed for controlling the various brake bands. This hydraulic system is illustrated only diagrammatically in Figure 1 of this application, but is illustrated more completely in application Serial No. 620,894, of W. O. Bechman et al., filed October 8, 1945, now Patent #2,470,209, for Vehicle change-speed steering apparatus, which application is a continuation-in-part of Serial No. 566,439, filed concurrently with the present application and now abandoned.

Brake actuating motors MBL, MHL, and MLL are respectively associated with the brake bands BL, HL, and LL, so that, when fluid under pressure is supplied to these motors, they will cause application of their associated brake bands to their mated brake drums for holding the latter against rotation. On the right side of the tractor, brake motors MLR, MHR, and MBR are disposed in operating relation respectively with the brake bands LR, HR, and BR for similar application of these brake bands when fluid is supplied to these motors under pressure. The supply of fluid under pressure to the various motors and the exhausting of the fluid from the motors when it is desired to release the brakes is controlled by a pair of valves VL and VR which are controlled by a pair of hand levers XL and XR. Each of these levers XL and XR is movable between positions B, L, and H. When the lever XL is in the position shown (position L), its associated valve VL will be adjusted for imposing pressure fluid upon the motor MLL to cause brake applying energization of the motor MLL, whereby the brake band LL is applied and the left-hand component of the gearing, illustrated in Figure 2, is conditioned for transmitting drive to the left-hand track TL at the low speed. Movement of the lever XL into its position H will cause deenergization of the motor MLL to disestablish connection of the low speed train and to cause energization of the motor MHL, whereby the brake band HL is applied for establishing the high speed power train which drives the left-hand track TL. When the lever XL is placed in the position B, both of the motors MLL and MHL will be deenergized while the motor MBL is energized to apply the brake band BL whereby the track TL will be constrained against propelling movement.

Lever XR controls the valve VR when the lever is moved between its positions B, L, and H to cause individual energization of the right-hand motors MBR, MLR, and MHR, respectively, as just explained with respect to the left-hand lever XL and the left-hand motors.

A transmission gear compartment is designated G and shown in dotted lines in Figure 1. A change speed gearing of conventional construction (not shown) is contained within the compartment G and the tail shaft of this transmission is the shaft 11 driving the above described pinion 12. The gearing in compartment G is capable of driving the shaft 11, either forwardly or rearwardly at different speeds, and it follows that the tracks TL and TR may be driven at twice the number of speeds in the forward direction as the shaft 11 can be driven forwardly by power trains of the gearing in the compartment G and, likewise, the tracks TL and TR can be driven at twice the number of speeds rearwardly as the transmission gearing in G is capable of driving the shaft 11 in the reverse direction.

Assuming the gearing in the transmission compartment G is to be set for forward driving of the shaft 11 and both of the control levers XL and XR to be in the position shown, at L, the vehicle will be driven forwardly in a straight course and at the slower of two instantaneously selectable speeds. Should it be desired to increase the speed of the vehicle upon this straight course, both of the levers XL and XR will be pushed forwardly simultaneously into the positions H, thereby disconnecting the two low speed trains in the transmission of Figure 2 and establishing the higher speed train. Irrespective of the speed at which the gearing in the compartment G is set, the speed of the tracks TL and TR can be instantaneously changed by shifting between the high and low speed of the transmission gearing in Figure 2.

Steering of the vehicle is accomplished by independent manipulation of the levers XL and XR to place them in different speed positions or in the braking position B. Assuming the levers XL and XR to be in low positions, illustrated in Figure 1, turning to the left can be accomplished in one of two ways. First, by pulling the lever XL rearwardly into position B while the lever XR is left in the position L. This will cause braking of the left-hand track TL while the track TR continues rotating forwardly at the lowest speed. This will cause the vehicle to make a pivot turn about a vertical axis substantially intersecting a mid-portion of the track TL. Secondly, while the levers XL and XR are in the positions L, a turn to the left may be executed by pushing the lever XR forwardly into the position H while leaving the lever XL at its position L. This maneuver will leave the track TL running forwardly at the low speed, but will cause the track TR to increase its speed, whereby the turn to the left instead of being a pivot turn, as in the first described instance, will be a turn upon an arc about a point to the left of the tractor.

While the lever XL is in any of its positions B, L, and H, the lever XR may be concurrently placed in any of its positions B, L, and H or vice versa. Consequently, while the tractor is turning to the left upon the fixed arc with the lever XL in the position L and the lever XR in the position H, the lever XL could be moved rearwardly into position B for causing the vehicle to commence a pivot turn about a vertical axis in the track TL, or, the lever could be moved forwardly into the position H for causing the vehicle to depart from the arcuate path and move in a straight path at the higher of the two speeds attainable through the transmission shown in Figure 2.

Similar maneuvers can be obtained when the vehicle is to be turned to the right. While the lever XR is in the position B, the lever XL can also be placed in position B, whereby brakes will be applied to both of the tracks TL and TR. This condition is sometimes desirable when the vehicle is proceeding down-hill with a non-braked load trailing behind. While both levers are in the position B, lever XL may be moved forwardly into position L, causing the left track TL to move forwardly at the slow speed, while the right track is braked against propelling movement and the vehicle is thus caused to pivot about a vertical axis intersecting the track TR. Movement of the lever XL into the position H will cause the same character of pivotal turn about the vertical axis intersecting the track TR but at greater speed. While the right lever XR is at its position L, turning to the right about an axis spaced to the right from the track TR can be obtained by moving the lever XL into the high speed position H for the track TL.

In this description of the effect of applying the various steering brakes, it has been assumed that the vehicle has been operating with the transmission gearing in the compartment G set in a forward speed. Similar manipulations of the levers XL and XR can be utilized for steering and turning the vehicle when it is connected through the transmission in compartment G for driving in a rearward direction.

Disassociation of driving connections with the tracks TL and TR is obtainable by applying both brake bands BL and BR incident to moving the levers XL and XR into their positions B. This disestablishes both of the power transmitting trains in the steering transmission of Figure 2 incident to applying the brakes. Disconnection between the tractor engine and the tracks TR and TL is also possible by the disconnection of the main clutch (not shown) between the engine and the gearing in the compartment G.

In addition to the brake bands BL and BR being controlled by the energized motors MBL and MBR, these brake bands are also controllable in an emergency by brake pedals PL and PR. Pedal PR is connected by a link 71, one arm 72 of a rock-shaft 73, and a second arm 74 of this rock-shaft is connected with a link 75 which connects with a piston (not shown) in the motor MBL. Depression of the pedal PL is operable through the just described linkage for moving the piston of the motor MBL and applying the brake band BL independently of fluid pressure supplied to the motor MBL. A corresponding linkage is disposed between the pedal PR and the piston in the motor MBR, such linkage including a link 76, a rock-shaft arm 77, rock-shaft 78, a rock-shaft arm 79, and a piston-connecting link 81. Normally, the brakes controlled by the pedals PL and PR will be engaged by means of these pedals only in an emergency as where the fluid system should fail while the vehicle is proceeding up or down a steep incline.

An important advantage of a steering and driving transmission unit, as that disclosed in Figure 2, is that it is adapted to be controlled in the same manner to obtain vehicle maneuvers for steering, irrespective of whether the vehicle is proceeding up-hill or down-hill or on a level course. In conventionally used driving and steering gears upon the crawler tractors, turning of the vehicle in one direction is brought about by disconnecting the power connection between one of the tracks and the vehicle engine. The turn normally is made toward the side of the vehicle at which the track is disposed which has its driving force interrupted. When proceeding down-hill with a load tending to push the vehicle, instead of the vehicle tending to pull the load, such release of the power train at one side of the vehicle will result in the tendency to turn the vehicle in the opposite direction because of the load tending to push the released track at greater speed than the track remaining connected with the engine which serves as a brake therefor. By employing change speed steering gear of the present kind, turns to the right or to the left while proceeding down-hill can be effected by concurrently establishing power trains of different speed ratio respectively between the tracks and the vehicle engine, whereby the engine will continue to serve as a brake for the tracks while permitting them to rotate at different speeds. The relative rotating speeds of the tracks under these conditions is the same as under pulling conditions, wherefore, the tractor operator is not confronted with the potentiality of becoming confused by reversed steering conditions during precarious down-hill steering.

For convenience, the invention has been illustrated in a single embodiment in conjunction with a tractor having continuous tracks at its sides. However, it is recognized that the invention is equally useful when utilized with a vehicle having non-steerable traction wheels (one type being shown in U. S. Patent No. 1,446,121) which change the vehicles course by changes in relative speed just as do the tracks TL and TR in the present drawings. Therefore, it is intended for the scope of the appended claims to include this type of wheel tractor as well as the continuous track type, and that the term "track-driving" applied to the shafts in some of the claims shall connote that the shafts may drive ground-engaging traction wheels as well as the continuous tracks.

Having thus described a preferred form of the invention, we claim:

1. In a change speed steering gear for transmitting driving force to components of propelling means of a tractor having axially spaced bearings and which is steered by controlling the relative speed of said components; the combination of a planet gear carrier having opposite end portions for rotative support in said bearings and having end openings in such end portions, planet gear sets in the opposite end portions of said carrier, each planet gear set including a plurality of coaxial-gear groups in which the gears in each group are constrained for rotation in unison, said gear groups each including at least three gears of different diameter, propelling-means-driving shafts coaxial with the carrier and projecting oppositely outwardly thereof through its end portion openings, shaft-driving sun gears respectively constrained for rotation with said shafts and respectively mutually meshed with the gears of one diameter in their associated planet gear set, speed determining sun gears independently rotatable about one of said shafts and respectively mutually meshed with the planet gears of the other diameters associated therewith, additional speed determining sun gears independently rotatable about the other shaft and respectively mutually meshed with the planet gears of the other diameters associated therewith, sleeve shafts respectively rotatively fixed with said speed determining sun gears and projecting outwardly through the associated carrier end openings, and brake means respectively upon the portions of said sleeves projecting outwardly from the carrier.

2. In a change speed steering gear for transmitting driving force to components of propelling means of a tractor having axially spaced bearings and which is steered by controlling the relative speed of said components; the combination of a planet gear carrier having opposite end portions for rotative support in said bearings, said carrier end portions having internal bearings, outer sleeve shafts journaled in said internal bearings and having inner and outer end portions disposed inwardly and outwardly of the carrier, inner sleeve shafts journaled in the outer sleeve shafts and having inner and outer end portions disposed inwardly and outwardly of the corresponding end portions of their associated outer sleeve shafts, sun gears respectively upon and constrained for rotation with the inner end portions of said sleeve shafts and the sun gears on the inner sleeves being of less diameter than the inside diameter of the outer sleeves to facilitate insertion and withdrawal of the inner sleeves and gears through the outer sleeves, coaxial propelling-means-driving shafts coaxial with the carrier and with said sleeve shafts and having inner end portions rotatively supported in the carrier between the inner ends of said sleeve shafts, said propelling-means-driving shafts projecting oppositely outwardly of the carrier through the inner sleeve shafts, sun gears rotatively fixed upon the inner end portions of the propelling-means-driving shafts, sets of planet gears respectively in the two carrier end portions, each set of planet gears including a plurality of gear clusters each containing a large diameter gear, a small diameter gear and an intermediate diameter gear, the small diameter gears in each planet set meshing with the associated propelling-means-driving shaft gear, the large diameter gears in each planet set meshing with their associated inner sleeve shaft gear, the intermediate diameter gears in each planet set meshing with their associated outer sleeve shaft gear, and means upon the outer end portions of said sleeve shafts to facilitate connection thereof with the tractor to resist rotation of said sleeve shafts.

DAVID B. BAKER.
WILLIAM O. BECHMAN.
WILLIAM W. HENNING.

(References on following page)

REFERENCES CITED

The following references are of record in the file of this patent:

UNITED STATES PATENTS

| Number | Name | Date |
|---|---|---|
| 1,423,941 | Jett | July 25, 1922 |
| 1,424,446 | Buckendale | Aug. 1, 1922 |
| 1,567,320 | Davis | Dec. 29, 1925 |
| 2,159,983 | Colby | May 30, 1939 |

FOREIGN PATENTS

| Number | Country | Date |
|---|---|---|
| 4,783B | Great Britain | Feb. 27, 1906 |